US012674519B2

(12) United States Patent
Zhu et al.

(10) Patent No.: US 12,674,519 B2
(45) Date of Patent: Jul. 7, 2026

(54) RELIEF VALVES FOR HIGH TEMPERATURE FLUID

(71) Applicant: Emerson Automation Solutions Final Control (Shanghai) Co., Ltd., Shanghai (CN)

(72) Inventors: Randy Zhu, Suzhou City (CN); Michael Shi, Suzhou City (CN)

(73) Assignee: Emerson Automation Solutions Final Control (Shanghai) Co., Ltd., Shanghai (CN)

( * ) Notice: Subject to any disclaimer, the term of this patent is extended or adjusted under 35 U.S.C. 154(b) by 2 days.

(21) Appl. No.: 18/945,156

(22) Filed: Nov. 12, 2024

(65) Prior Publication Data

US 2026/0117883 A1 Apr. 30, 2026

(30) Foreign Application Priority Data

Oct. 31, 2024 (CN) .......................... 202411537950.8

(51) Int. Cl.
 *F16K 27/10* (2006.01)
 *F16K 17/04* (2006.01)
 (Continued)

(52) U.S. Cl.
 CPC ............ *F16K 27/102* (2013.01); *F16K 17/04* (2013.01); *F16K 17/0413* (2013.01);
 (Continued)

(58) Field of Classification Search
 CPC .... F16K 17/0486; F16K 17/06; F16K 17/168; F16K 17/0413; F16K 27/102
 See application file for complete search history.

(56) References Cited

U.S. PATENT DOCUMENTS 3,282,289 A * 11/1966 Vick ................... F16K 17/0433
 277/584
4,481,974 A * 11/1984 Schmitt ................... F16K 17/04
 137/542

(Continued)

FOREIGN PATENT DOCUMENTS

JP 2003343210 A * 12/2003
JP 2007211814 A * 8/2007

OTHER PUBLICATIONS

CSTM, "T/CSTM 00017.1—2021 Martensitic heat-resistant steel of 08Cr9W3C03VNbCuBN(G115) for power station," Apr. 20, 2021, 32 pages.

*Primary Examiner* — Atif H Chaudry
(74) *Attorney, Agent, or Firm* — Hanley, Flight & Zimmerman, LLC

(57) ABSTRACT

Relief valves are described herein. An example relief valve includes a valve body defining a fluid passageway between an inlet and an outlet. The valve body includes a first body portion having a first side with a first opening and a second with a second opening. The second opening forms the outlet of the fluid passageway. The first body portion is constructed of a first material. The valve body also includes a second body portion coupled to the first side of the first portion. The second body portion has a channel aligned with the first opening. The second body portion forms the inlet of the fluid passageway. The second body portion is constructed of a second material having a higher temperature rating than the first material. The relief valve also includes a nozzle and a flow control member moveable.

18 Claims, 4 Drawing Sheets

(51) Int. Cl.
F16K 17/06 (2006.01)
F16K 17/168 (2006.01)

(52) U.S. Cl.
CPC .......... F16K 17/0486 (2013.01); F16K 17/06 (2013.01); F16K 17/168 (2013.01)

(56) References Cited

U.S. PATENT DOCUMENTS 4,485,843 A * 12/1984 Wolff .................... F16K 15/063
137/514
2017/0307094 A1* 10/2017 Choate .................... F16K 17/06

* cited by examiner

RELIEF VALVES FOR HIGH TEMPERATURE FLUID

RELATED APPLICATION

This patent arises from the Chinese Patent Application No. 202411537950.8, which was filed on Oct. 31, 2024. Chinese Patent Application No. 202411537950.8 is hereby incorporated herein by reference in its entirety. Priority to Chinese Patent Application No. 202411537950.8 is hereby claimed.

FIELD OF THE DISCLOSURE

This disclosure relates generally to valves and, more particularly, to relief valves for high temperature fluid.

BACKGROUND

Valves are commonly used in process control systems to control the flow of fluid (e.g., liquids, gases, etc.) between two locations. Some types of valves are configured as relief valves. Relief valves are design to protect a system from high temperature/pressure instances that could potentially damage other parts of the system.

SUMMARY

An example relief valve disclosed herein includes a valve body defining a fluid passageway between an inlet and an outlet. The valve body includes a first body portion having a first side with a first opening and a second with a second opening. The second opening forms the outlet of the fluid passageway. The first body portion is constructed of a first material. The valve body also includes a second body portion coupled to the first side of the first body portion. The second body portion has a channel aligned with the first opening. The second body portion forms the inlet of the fluid passageway. The second body portion is constructed of a second material having a higher temperature rating than the first material. The relief valve also includes a nozzle disposed in the fluid passageway. The nozzle has an end forming a seat. The relief valve further includes a flow control member that is moveable relative to the seat between a closed position and an open position.

Figure 1:
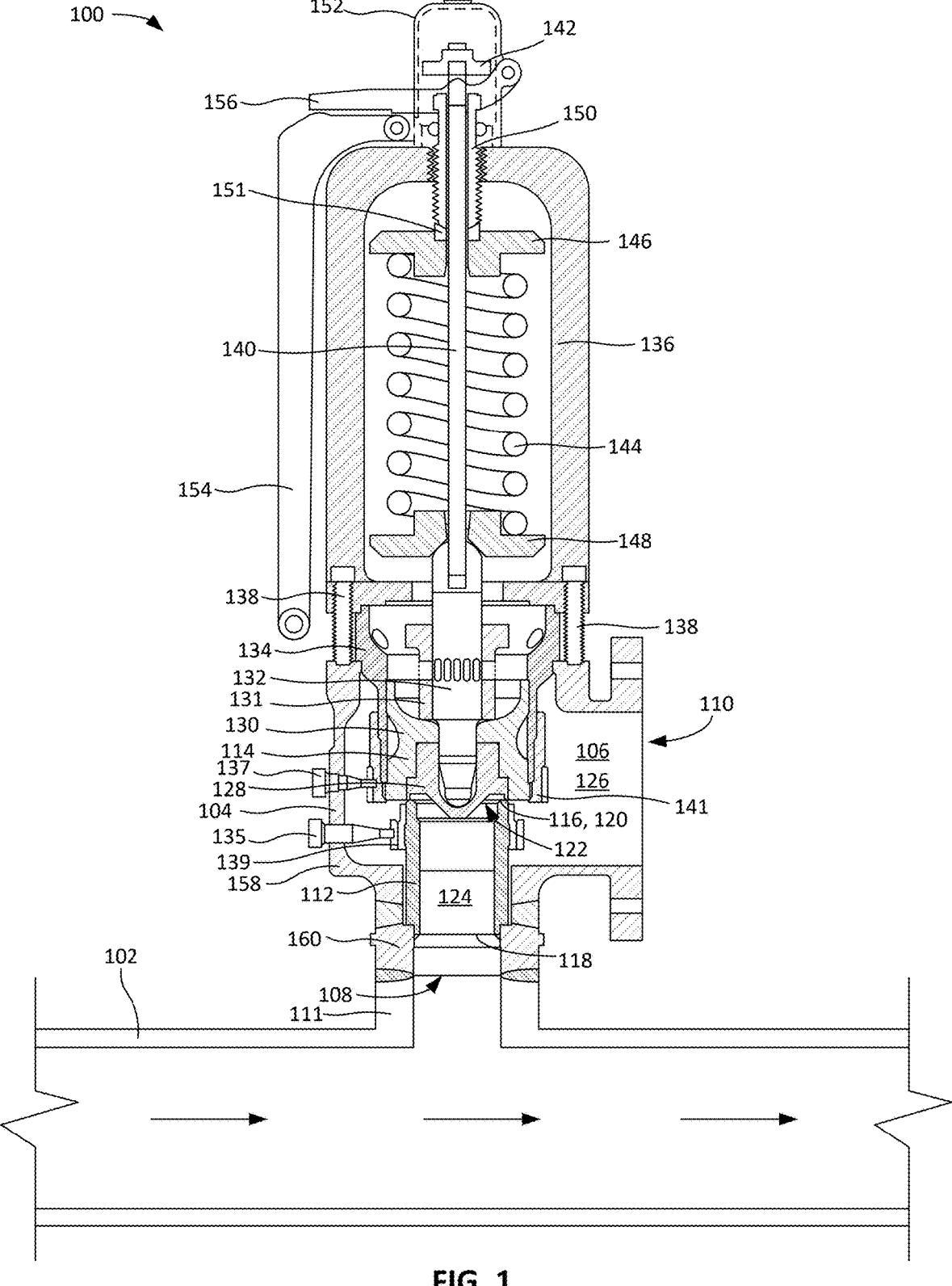
FIG. 1 is a cross-sectional view of an example relief valve having an example valve body including an example first body portion and an example second body portion constructed of different materials.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Relief valves, sometimes referred to as safety valves or safety relief valves, are often used in process control systems having relatively high pressure and/or high temperature fluid to protect the system from over-pressurization and/or over-heating. For example, many power plants and other power generation stations generate high pressure/temperature steam to drive turbines to generate electricity. The steam contained and/or routed by various pipes. One or more relief valves can be connected to the steam pipes. A relieve valve is a self-actuated device that is configured to open when a pressure in the system exceeds a pre-set pressure or level. Therefore, if the pressure (which is directly based on the temperature) in the pipes exceeds the pre-set pressure level, the relieve valve opens and vents the high pressure/temperature steam to the atmosphere or a collection system. As such, the relief valve prevents the system from potential damage due to over-pressurization and/or high temperatures.

Presently, the highest steam temperature of the world's coal-fired power stations is about 600 degrees Celsius (° C.). This is mainly because the steel for pipelines is constructed of P92 martensitic heat-resistance steel with a temperature rating of up to 622° C. Recently, it has been desired to increase the steam temperature at these power stations, such as up to 630° C., which can greatly increase output power. This requires thicker-walled tubes constructed of martensitic heat-resistant steal that can be used up to 650° C. metal wall temperature. In traditional relief valves, the inlet portion of the valve body is always exposed to the high temperature fluid in the fluid system. However, these traditional relief valves have valve bodies constructed of C12A steel, which has a temperature rating similar to (but not greater) traditional P92 steel pipes. Therefore, current relief valves are not designed to be used in higher temperature/pressure applications up to the desired 650° C.

Disclosed herein are example relief valves that include a sleeve or valve body portion constructed of a higher temperature rated material, such as G115, coupled to an inlet portion of the valve body. The sleeve is the only portion of the valve body that is exposed to the high temperature fluid. As such, the rest of the valve body can be constructed of traditional, less-expensive material, that has a lower temperature rating, such as C12A. As such, the example relief valves can be used in higher temperature applications/conditions, without significantly increasing costs associated with manufacture of the valve. While high pressure steam systems are one example application for relief valves, the example relief valves disclosed herein can similarly be used in connection with other process control systems.

FIG. 1 is a cross-sectional view of an example relief valve 100 constructed in accordance with the teachings of this disclosure. The example relief valve 100 can be used in connection with any fluid distribution system and is configured to vent fluid when an inlet pressure reaches a threshold level, thereby preventing over-pressurization and/or over-heating of the fluid distribution system components. For example, in FIG. 1, the relief valve 100 is shown as coupled to a pipe 102. The pipe 102 can be a pipe of a fluid distribution system that contains a fluid, such as steam, but can be used in connection with any other type of fluid (e.g., natural gas, oil, etc.). The relief valve 100 is normally in a closed state. However, should the pressure in the pipe 102 reach a certain level, referred to as a set or trigger pressure, the relief valve 100 opens and thereby vents the high-pressure fluid to the atmosphere. As such, the relief valve 100 helps to prevent or limit over-pressurization and/or over-heating of the fluid distribution system that may cause damage to the pipe 102 and/or other downstream compo-nents.

In the illustrated example of FIG. 1, the relief valve 100 includes a valve body 104. The valve body 104 defines a fluid passageway 106 between an inlet 108 and an outlet 110. The relief valve 100 is configured to control the flow of fluid between the inlet 108 and the outlet 110. The valve body 104 is coupled to the pipe 102 such that the inlet 108 is in fluid communication with the pipe 102 and receives fluid from the pipe 102. In particular, in this example, an inlet pipe 111 is welded to the pipe 102, and the valve body 104 is welded to the inlet pipe 111. However, in other examples, the valve body 104 can be coupled to the inlet pipe 111 via other mechanical and/or chemical techniques (e.g., a bolted flange).

To control the flow of fluid through the fluid passageway 106, the relief valve 100 includes a nozzle 112 and a flow control member 114 (e.g., a piston, a plug, a disc, etc.). The nozzle 112 is a cylinder or tube-shaped member. The nozzle 112 is disposed in the fluid passageway 106 and coupled to an inner surface of the valve body 104 near the inlet 108. The nozzle 112 has a first end 116 and a second end 118 opposite the first end 116. The first end 116 forms a seat 120 that defines a flow control opening 122 (sometimes referred to as an orifice). The seat 120 divides the fluid passageway 106 into an upstream portion 124 (upstream of the seat 120 or flow control opening 122) and a downstream portion 126 (downstream of the seat 120 or flow control opening 122). The upstream portion 124 and the downstream portion 126 may also be referred to as an inlet portion and an outlet portion, respectively.

The flow control member 114 can be constructed of multiple parts or components coupled together. For example, the flow control member 114 in this example includes a disc 128, a disc holder 130, a disc retainer 131, and a spindle point 132. The disc 128, the disc holder 130, the disc retainer 131, and the spindle point 132 are coupled and move together as a unit. The relief valve 100 includes a guide 134, which may also be referred to as a cage. The flow control member 114 is slidably disposed in the guide 134. In the illustrated example, the relief valve 100 includes a nozzle ring screw 135 and a guide ring screw 137 for adjusting the position of a nozzle ring 139 and a guide ring 141, respec-tively, to adjust the seat tightness and blowdown. The flow control member 114 is movable relative to the seat 120 to control the flow of fluid through the flow control opening 122 and, thus, between the inlet 108 and the outlet 110. In particular, the flow control member 114 is moveable relative to the seat 120 between a closed position and an open position. In the closed position, which is the position shown in FIG. 1, the disc 128 of the flow control member 114 is sealingly engaged with the seat 120, which blocks or pre-vents fluid flow through the flow control opening 122 and, thus, prevents fluid flow between the inlet 108 and the outlet 110. In the open position, the flow control member 114 is moved away from (upward in FIG. 1) the seat 120, which allows fluid to flow through the flow control opening 122 from the inlet 108 to the outlet 110.

In the illustrated example, the relief valve 100 includes a bonnet 136 coupled the valve body 104. In this example, the bonnet 136 is coupled to the valve body 104 via bolts 138. The guide 134 is clamped between the bonnet 136 and the valve body 104. In other examples, the bonnet 136 and/or the guide 134 can be coupled to the valve body 104 via other mechanisms.

In the illustrated example, the relief valve 100 includes a stem 140, which may also be referred to as a spindle or spindle rod. The stem 140 is coupled to the flow control member 114. For example, the stem 140 may be threadably coupled to the spindle point 132, which is threadably coupled to the disc 128. Therefore, the stem 140 and the flow control member 114 are fixedly coupled and move together as a unit. A stem nut 142 is coupled to a top end of the stem 140.

In the illustrated example, the relief valve 100 includes a spring 144. The spring 144 is used to control or set the pressure at which the relief valve 100 opens and closes. The spring 144 is disposed around or coaxial with the stem 140. The spring 144 is disposed and compressed between an upper spring plate 146 and a lower spring plate 148. The lower spring plate 148 is engaged with the flow control member 114. As such, the spring 144 provides a downward bias or force on the flow control member 114 to maintain the flow control member 114 in the closed position. In some examples, the lower spring plate 148 is physically coupled to the stem 140 and/or the flow control member 114 (e.g., coupled to the spindle point 132). The upper and lower spring plates 146, 148 are slidable along the stem 140. The relief valve 100 includes an adjusting bolt 150 that is screwed into the bonnet 136. The stem 140 extends through a central opening in the adjusting bolt 150 such the stem 140 and the adjusting bolt 150 are independently moveable. The adjusting bolt 150 is engaged with a bushing 151 on the upper spring plate 146. To increase the downward spring force provided by the spring 144, the adjusting bolt 150 can be tightened (e.g., screwed into the bonnet 136), which moves the upper spring plate 146 toward the lower spring plate 148, which compresses the spring 144 between the upper and lower spring plates 146, 148. This increases the spring compression, and therefore increases the downward spring force on the flow control member 114. Conversely, to reduce or lessen the downward spring force, the adjusting bolt 150 can be loosened (e.g., unscrewed from the bonnet 136), which allows the upper spring plate 146 to move upward and therefore allows the spring 144 to expand. In the illustrated example, the relief valve 100 includes a cap 152 that is coupled to the bonnet 136 and covers the stem nut 142 and the adjusting bolt 150. The cap 152 can be removed to access the adjusting bolt 150.

During normal operation, the flow control member 114 is in the closed position shown in FIG. 1. Fluid (e.g., steam) from the pipe 102 fills the upstream portion 124 of the relief valve 100. The high pressure fluid creates an upward force on the flow control member 114. This upward force is countered by a downward force provided by the spring 144, and therefore maintains the flow control member 114 the closed position. However, if the pressure in the pipe 102 exceeds a certain set pressure, the upward force on the flow control member 114 overcomes the downward spring force and the flow control member 114 is pushed upward and away from the seat 120. As such, the high pressure fluid in the pipe 102 is allowed to flow through the nozzle 112 and out the outlet 110 of the relief valve 100. In some examples, the outlet 110 is vented to the atmosphere, but in other examples can be fluidly connected to a fluid collection system (e.g., a reservoir, a tank, etc.). Once the pressure drops below the set pressure, the spring force moves the flow control member 114 back downward and into the closed position again. Therefore, the set pressure at which the relief valve 100 is configured to open is based on the spring force provided by the spring 144. As mentioned above, the adjusting bolt 150 can be used to increase or decrease the spring force, which increases or decreases the set pressure at which the relief valve 100 is configured to open.

In the illustrated example, the relief valve 100 includes a hand lever 154 that can be used to manually open the relief valve 100. The hand lever 154 is pivotably coupled to the bonnet 136. The hand lever 154 is engaged with a forked lever 156 that is engaged with the stem nut 142 on the top of the stem 140. If the hand lever 154 is lifted upward, the fork lever 156 moves the stem nut 142 upward, which moves the stem 140 upward and therefore moves the flow control member 114 to the open position. Conversely, if the hand lever 154 is moved downward, the stem 140 and the flow control member are allowed to move back toward the closed position by the force from the spring 144. Therefore, the hand lever 154 can be used to manually open or close the relief valve 100.

In the illustrated example, the valve body 104 includes or is constructed of a first body portion 158 and a second body portion 160. The first and second body portions 158, 160 are coupled together and define the fluid passageway 106. The first body portion 158 may be referred to as a primary body or casting body, and the second body portion 160 may be referred to as a sleeve.

Figure 2:
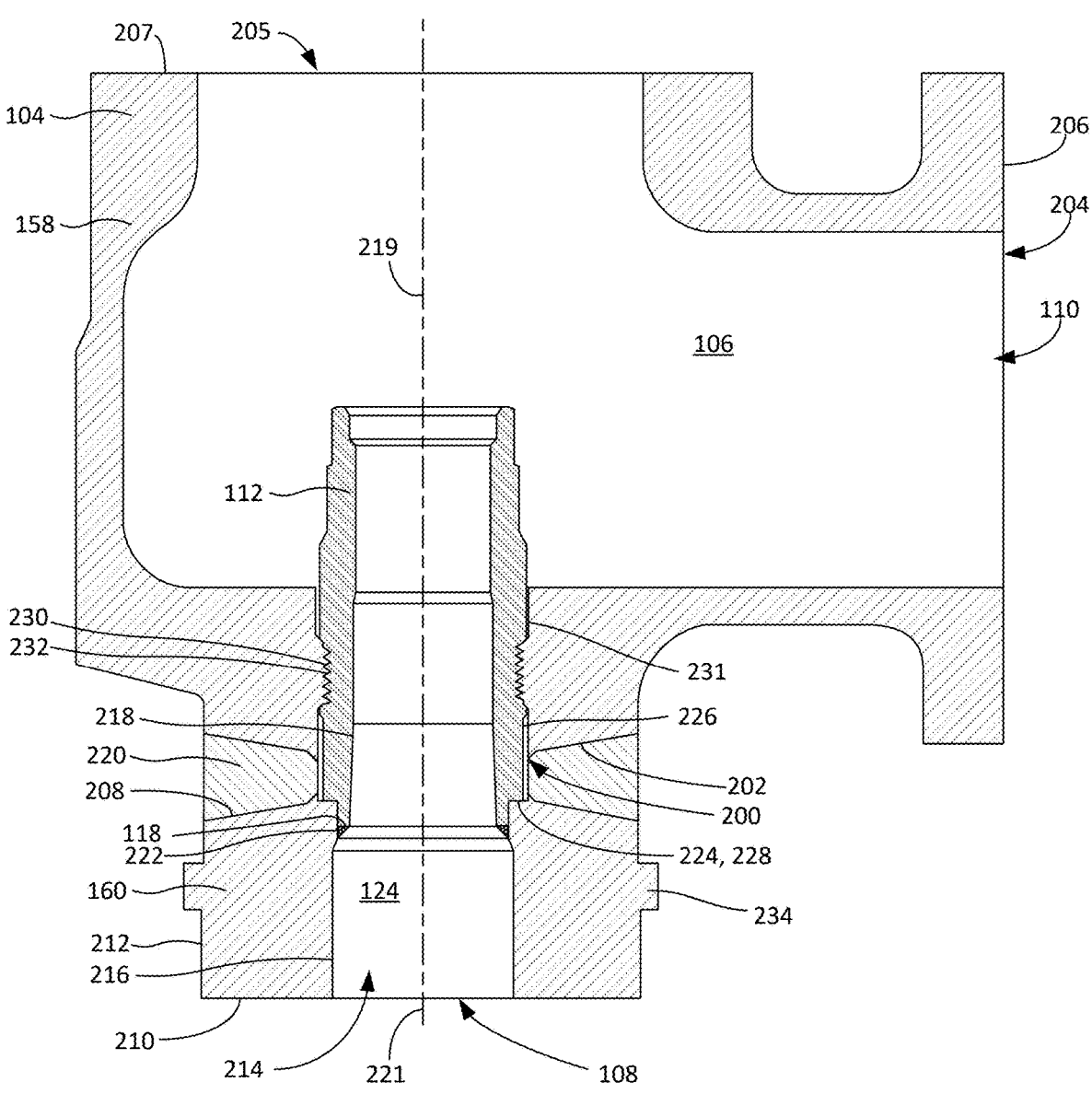
FIG. 2 is an enlarged cross-sectional view of the example valve body of FIG. 1 showing the example first body portion and the example second body portion and an example nozzle.

FIG. 2 is an enlarged cross-sectional view of the valve body 104 (including the first and second body portions 158, 160) and the nozzle 112. The other components of the relief valve 100 have been removed for clarity. As shown in FIG. 2, the first body portion 158 defines a first opening 200 in a first side 202 of the first body portion 158, a second opening 204 in a second side 206 of the first body portion 158, and a third opening 205 in a third side 207 of the first body portion 158. The first opening 200 is connected to the second body portion 160 to form the inlet 108, as disclosed in further detail herein. The second opening 204 forms the outlet 110 of the fluid passageway 106. When the relief valve 100 is assembled, the guide 134 (FIG. 1) is disposed in the third opening 205 and prevents fluid from leaking out of the third opening 205. The third opening 205 can be used to install the nozzle 112, the flow control member 114, the guide 134, and other internal components.

The second body portion 160 is cylindrical or tube-shaped. The second body portion 160 has a first end 208, a second end 210 opposite the first end 208, an outer side surface 212, and a channel or passage 214 defined by an inner surface 216 extending between the first end 208 and the second end 210. The second body portion 160 is coupled to the first body portion 158. In particular, in this example, the first end 208 of the second body portion 160 is coupled to the first side 202 of the first body portion 158 such that the channel 214 is aligned with the first opening 200. For example, the first opening 200 in the first body portion 158 has a central axis 219, and the second body portion 160 has a central axis 221 that is coaxial or aligned with the central axis 219. The second body portion 160 forms the inlet 108 of the fluid passageway 106. In particular, once the second body portion 160 is coupled to the first body portion 158, the opening of the channel 214 at the second end 210 of the second body portion 160 corresponds to the inlet 108 of the fluid passageway 106.

As disclosed above, the second body portion 160 is coupled to the first body portion 158 at the first opening 200. Further, the nozzle 112 extends through the first opening 200 and is coupled to the inner surface 216 of the second body portion 160. As such, the upstream portion 124 of the fluid passageway 106 is formed by the inner surface 216 of the second body portion 160 and by an inner surface 218 of the nozzle 112. As a result, when the relief valve 100 is closed, none of the first body portion 158 is exposed to the high pressure/temperature fluid in the upstream portion 124 of the fluid passageway 106. Instead, only the second body portion 160 is exposed to the high pressure/temperature fluid in the upstream portion 124.

The first and second body portions 158, 160 are constructed of different materials. In particular, the first body portion 158 is constructed of a first material, and the second body portion 160 is constructed of a second material that is different than the first material. The second material of the second body portion 160 has a higher temperature rating (i.e., able to withstand higher temperatures) than the first material of the first body portion 158. For example, the first body portion 158 may be constructed of C12A, and the second body portion 160 may be constructed of G115. C12A is chromium-molybdenum-vanadium alloy steel, also known from the standard as ASME BPVC SEC II part A—2023. C12A is a less expensive material, but has a lower temperature rating than G115. G115 (08Cr9W3Co3VNbCuBN), also known as T/CSTM 00017-2021, is a heat-resistant martensitic steel. G115 is a more expensive material than C12A, but has a higher temperature rating than C12A. In particular, G115 has a temperature rating of higher than 650° C. Therefore, the first body portion 158, which constitutes a majority of the valve body 104, can still be constructed of less expensive material (e.g., C12A), while the second body portion 160, which forms a portion of the upstream portion 124 of the fluid passageway 106 exposed to the high temperature fluid, is constructed of a more heat-resistant material (e.g., G115) to withstand higher temperatures. This enables the relief valve 100 to be used in higher temperature applications because the inlet portion of the valve body 104 is constructed of higher temperature resistant material, while not significantly increasing costs. In other examples, the second body portion 160 can be constructed of other high temperature resistant materials, such as SA-182 F92 from the standard ASME BPVC SEC II part A-2023. The nozzle 112 and the disc 128 are also constructed of high temperature resistant material. In some examples, the nozzle 112 is constructed of nickel alloy 625 (e.g., Inconel® 625) and the disc 128 is constructed of nickel alloy 617 (e.g., Inconel® 617). As such, the entire upstream portion 124 of the fluid passageway 106 is constructed of higher temperature resistant material.

In this example, the first and second body portions 158, 160 of the valve body 104 are welded together. In particular, as shown in FIG. 2, the first side 202 of the first body portion 158 is welded to the first end 208 of the second body portion 160. This type of weld is referred to as a butt weld. The welding process deposits weld material 220 (sometimes referred to as filler material) between the first and second body portions 158, 160. As shown in FIG. 2, the first side 202 of the first body portion 158 and the first end 208 of the second body portion 160 are tapered or angled (e.g., non-parallel) away from each other in an outward radial direction. This creates a gap or space that increases in the radially outward direction. This shape is advantageous for butt welding. In some examples, the first and second body portions 158, 160 are welded using an arc welding process (e.g., shielded metal arc welding (SMAW) or stick welding). In other examples, other types of welding can be used, such as Tig welding, Mig welding, etc. In some examples, the weld material 220 is E9015-B91 (e.g., a 9% Cr-1% Mo covered electrode), which is advantageous for welding C12A and G115 together. In other examples, other filler materials can be used.

In the illustrated example, the nozzle 112 is welded to the second body portion 160, which forms a fluid tight seal between the nozzle 112 and the second body portion 160. In particular, the second end 118 of the nozzle 112 is welded to the inner surface 216 of the second body portion 160. This type of weld is referred to as a corner weld. The welding process deposits weld material 222 between the second end 118 of the nozzle 112 and the inner surface 216 of the second body portion 160. In some examples, the nozzle 112 is welded to the first body portion 158 using an arc welding process (e.g., shielded metal arc welding (SMAW) or stick welding). In some examples, the weld material 222 used to weld the nozzle 112 (nickel alloy 625) and the second body portion 160 (G115) is SFA5.11 (ENiCoMo-3).

In the illustrated example, the inner surface 216 of the second body portion 160 has a first shoulder 224, and an outer surface 226 of the nozzle 112 has a second shoulder 228 that is engaged with the first shoulder 224. This ensures the second end 118 of the nozzle 112 is inserted to a specific desired depth or location in the channel 214 of the second body portion 160 when the nozzle 112 is installed in the valve body 104.

In the illustrated example of FIG. 2, the nozzle 112 is threadably coupled to the first body portion 158. In particular, the outer surface 226 of the nozzle has first threads 230, and an inner surface 231 of the first body portion 158 has second threads 232. The first threads 230 are screwed into or meshed with the second threads 232. Thus, in this example, the nozzle 112 is coupled to the first body portion 158 via a threaded connection, and the nozzle 112 is coupled to the second body portion 160 via a welded connection.

An example method of assembling the valve body 104 and the nozzle 112 is disclosed herein and shown in FIGS. 3-6. In some examples, the first and second body portions 158, 160 are welded together first, then the inner surfaces of the first and second body portions 158, 160 are machined to formed the inlet opening diameters, and then the nozzle 112 is installed and welded to the second body portion 160. In some examples, it is advantageous to machine the parts after welding because the welding process may cause deformation of the parts.

Figure 3:
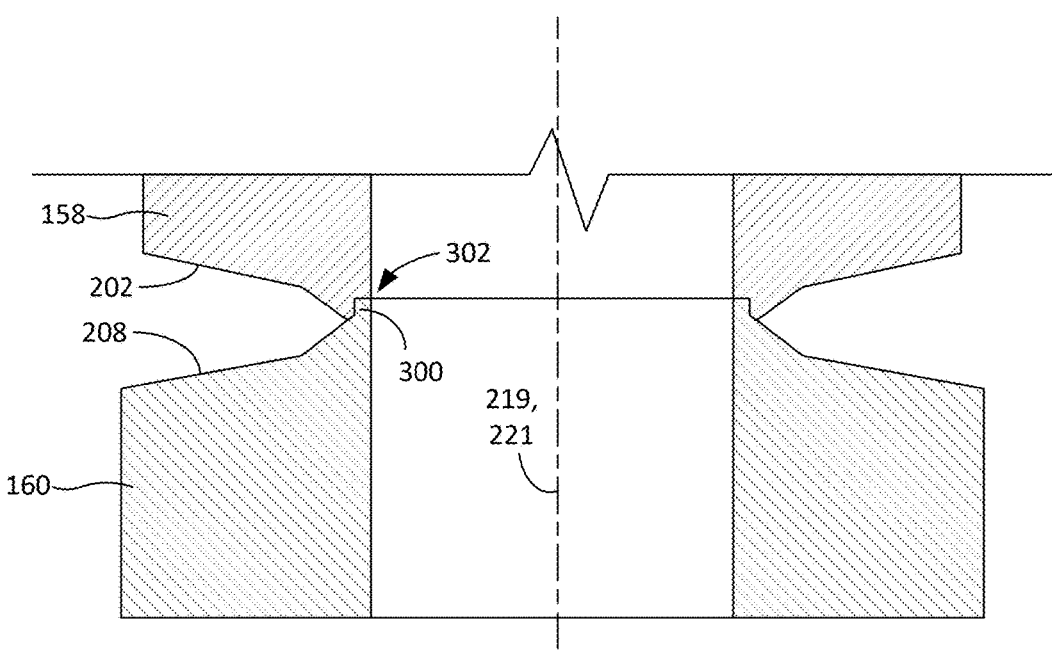
FIG. 3 is a cross-sectional view of the example second body portion being engaged with the example first body portion during an example method of assembling the example valve body of FIG. 1.
Figure 4:
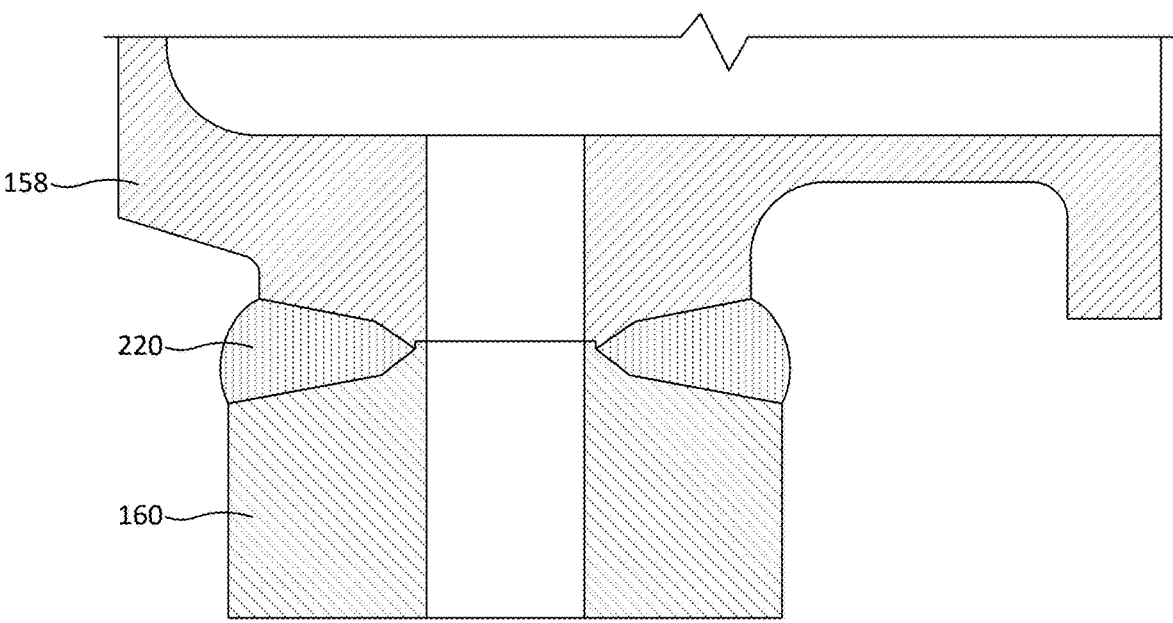
FIG. 4 is a cross-sectional view similar to FIG. 3 after the example first and second body portions have been welded together.

For example, FIG. 3 shows a cross-sectional view of the second body portion 160 before being welded to the first body portion 158 and machined. During the assembly process, the first end 208 of the second body portion 160 is brought into contact with the first side 202 of the first body portion 158. In the illustrated example, the first end 208 of the second body portion 160 has a lug or boss 300 that is received within a socket 302 on the first body portion 158. The lug 300 and the socket 302 align the first and second body portions 158, 160 such that the central axes 219, 221 are aligned. Then, as shown in FIG. 4, the first and second body portions 158, 160 are welded together. In some examples, arc welding is used to weld the second body portion 160 to the first body portion 158. The welding process forms or deposits the weld material 220 between the first and second body portions 158, 160. As shown in FIGS. 3 and 4, the original openings or channels in the first and second body portions 158, 160 are relatively smooth or have a constant diameter.

Figure 5:
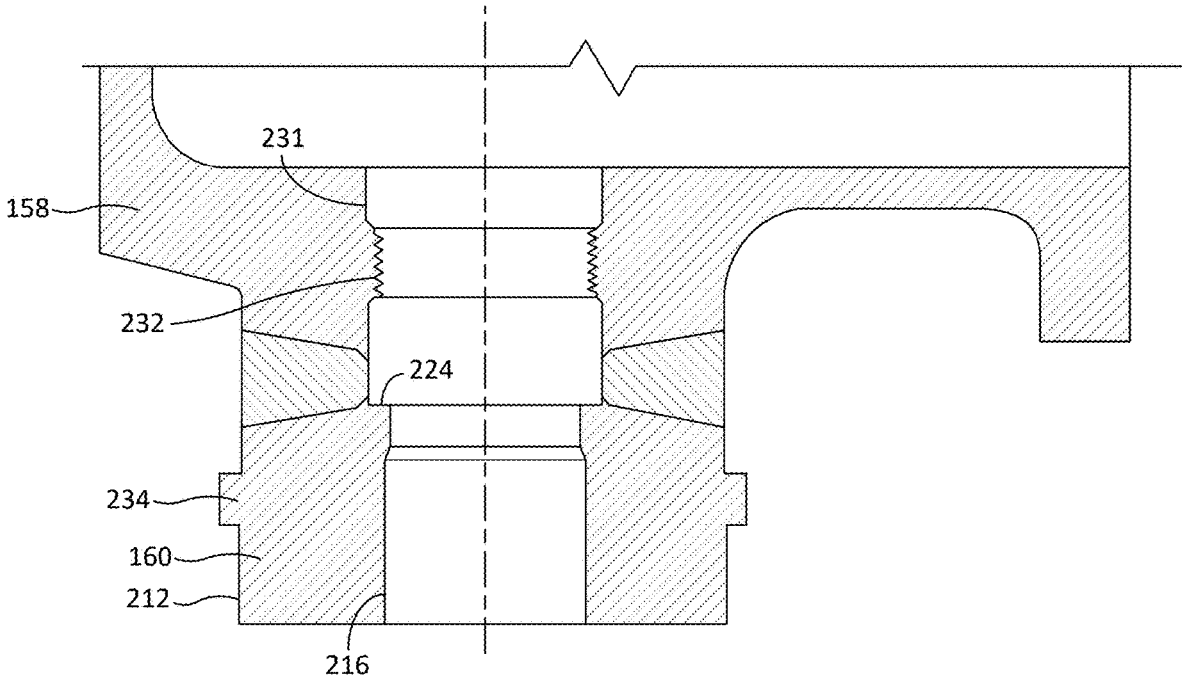
FIG. 5 is a cross-sectional view similar to FIG. 4 after the first and second body portions have been machined.

Then, as shown in FIG. 5, the inner surface 231 of the first body portion 158 is machined (e.g., drilled) to enlarge the opening and form the second threads 232 to receive the nozzle 112 (FIG. 2). The inner surface 216 of the second body portion 160 is also machined to form the shoulder 224. Further, the outer surface of the weld material 220 and the outer side surface 212 of the second body portion 160 are machined.

Then, the nozzle 112 (FIG. 2) is inserted into the fluid passageway 106 (FIG. 2) through the third opening 205 (FIG. 2). The nozzle 112 is screwed into the second threads 232 until the shoulders 224, 228 are engaged. Then, the second end 118 of the nozzle 112 is welded to the inner surface 216 of the second body portion 160. The welding process forms or deposits the weld material 222 (FIG. 2). Then, the flow control member 114 and other components can be installed in the valve body 104 through the third opening 205.

In some examples, as shown in FIGS. 2 and 5, the outer side surface 212 of the second body portion 160 has a craft flange 234 extending radially outward. In some examples, the craft flange 234 can be used to for clamping the valve body 104 to a test rig when testing the relief valve 100. In other examples, the second body portion 160 may not include the craft flange 234. Instead, the outer side surface 212 may be entirely smooth or have a constant diameter between the first and second ends 208, 210.

Figure 6:
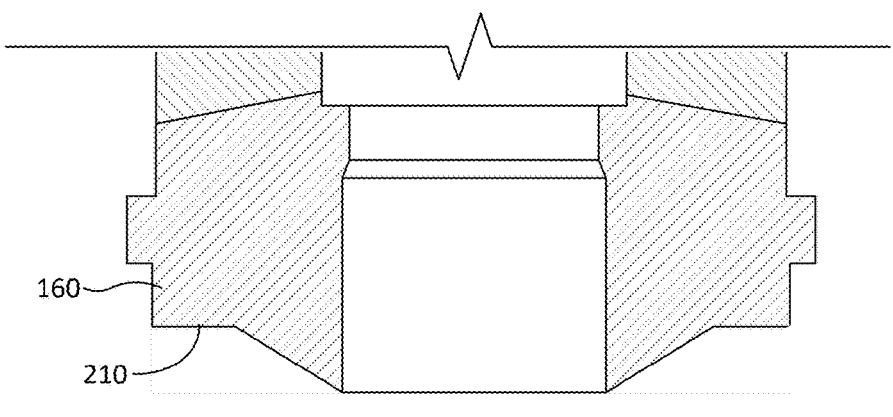
FIG. 6 is a cross-sectional view of the example second body portion of FIG. 5 after the bottom end has been machined in preparation for welding to another part.

In some examples, as shown in FIG. 5, the second end 210 of the second body portion 160 is flat. In some examples, the second end 210 can be machined prior to welding the second end 210 to the inlet pipe 111 (FIG. 1). For example, FIG. 6 is a cross-sectional view of the second body portion 160 after the second end 210 has been machined. As such, the second end 210 is angled or flared upward along the radial outward direction. When the second end 210 is brought adjacent the inlet pipe 111 (FIG. 1), a butt weld gap is formed between the second end 210 and the end of the inlet pipe 111.

While in some examples the second body portion 160 is welded to the inlet pipe 111, in other examples, the second body portion 160 can be coupled to the inlet pipe 111 in other manners. For example, the second body portion 160 may include a flange that can be bolted to a corresponding flange on the inlet pipe 111. In another example, the second body portion 160 can be coupled to the inlet pipe 111 by a double clamp type connector.

While the example valve body 104 with two body portions of different material is described in connection with a relief valve, the example valve bodies disclosed herein can similarly be implemented in connection with other types of valves or process fluid control devices, such as pressure regulators, ball valves, globe valves, butterfly valves, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

From the foregoing, it will be appreciated that example safety relief valves have been disclosed that include sleeves or valve body portions constructed of higher heat-resistant material. This enables the valves to operate in higher temperature applications, such as 650° C. steam in steam power stations. This enables the use of higher temperature steam for increased power in a power station.

Examples and combinations of example disclosed herein include the following:

Example 1 is a relief valve comprising a valve body defining a fluid passageway between an inlet and an outlet. The valve body includes a first body portion having a first side with a first opening and a second with a second opening. The second opening forms the outlet of the fluid passageway. The first body portion is constructed of a first material. The valve body also includes a second body portion coupled to the first side of the first body portion. The second body portion has a channel aligned with the first opening. The second body portion forms the inlet of the fluid passageway. The second body portion is constructed of a second material having a higher temperature rating than the first material. The relief valve also includes a nozzle disposed in the fluid passageway, the nozzle having an end forming a seat, and a flow control member moveable relative to the seat between a closed position and an open position.

Example 2 includes the relief valve of Example 1, wherein the first material of the first body portion is C12A, and the second material of the second body portion is G115.

Example 3 includes the relief valve of Example 2, wherein a first end of the second body portion is welded to the first side of the first body portion.

Example 4 includes the relief valve of Example 3, wherein weld material is deposited between the second body portion and the first body portion.

Example 5 includes the relief valve of Example 4, wherein the weld material is E9015-B91.

Example 6 includes the relief valve of any of Examples 3-5, wherein the first end of the second body portion is welded to the first side of the first body portion by a butt weld.

Example 7 includes the relief valve of Example 6, wherein the first side of the first body portion and the first end of the second body portion are angled away from each other in an outward radial direction.

Example 8 includes the relief valve of any of Examples 1-7, wherein the second body portion has a first end, a second opposite the first end, and a channel between the first and second ends, and wherein the first end is coupled to the first side of the first body portion, and wherein the channel at the second end of the second body portion forms the inlet.

Example 9 includes the relief valve of Example 8, wherein the second end is flat.

Example 10 includes the relief valve of Example 8, wherein the second end is tapered.

Example 11 includes the relief valve of any of Examples 1-10, wherein the end of the nozzle is a first end, the nozzle including a second end opposite the first end, wherein the first end is disposed in the second body portion.

Example 12 includes the relief valve of Example 11, wherein the second end is welded to an inner surface of the second body portion.

Example 13 includes the relief valve of Example 12, wherein the first material of the first body portion is C12A, the second material of the second body portion is G115, and the nozzle is constructed of nickel alloy 625.

Example 14 includes the relief valve of Examples 12 or 13, wherein the inner surface of the second body portion has a first shoulder, and an outer surface of the nozzle has a second shoulder engaged with the first shoulder.

Example 15 includes the relief valve of any of Examples 1-14, wherein the seat divides the fluid passageway into an upstream portion and a downstream portion, wherein the upstream portion is defined by an inner surface of the second body portion and by an inner surface of the nozzle.

Example 16 includes the relief valve of Example 15, wherein the first body portion of the valve body does not form or define the upstream portion of the fluid passageway.

Example 17 includes the relief valve of any of Examples 1-16, wherein the second body portion is not in direct connect with the first body portion.

Example 18 includes the relief valve of any of Examples 1-17, further including a spring to bias the flow control member toward the seat.

Example 19 includes the relief valve of Example 18, further including a hand lever to move the flow control member away from the seat.

Example 20 includes the relief valve of any of Examples 1-19, wherein an outer surface of the second body portion has a craft flange.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A relief valve comprising:
a valve body defining a fluid passageway between an inlet and an outlet, the valve body including:
   a first body portion having a first side with a first opening and a second side with a second opening, the second opening forming the outlet of the fluid passageway, the first body portion constructed of a first material; and
   a second body portion coupled to the first side of the first body portion, the second body portion disposed outside of the first body portion, the second body portion having a channel aligned with the first opening, the second body portion forming the inlet of the fluid passageway, the second body portion constructed of a second material having a higher temperature rating than the first material;
a nozzle disposed in the fluid passageway, the nozzle having a first end forming a seat and a second end opposite the first end, the first end disposed in the first body portion, an outer surface of the nozzle threadably coupled to an inner surface of the first body portion, the second end of the nozzle disposed in the second body portion and welded to an inner surface of the second body portion; and a flow control member moveable relative to the seat between a closed position and an open position.

2. The relief valve of claim 1, wherein the first material of the first body portion is C12A, and the second material of the second body portion is G115.

3. The relief valve of claim 2, wherein a first end of the second body portion is welded to the first side of the first body portion.

4. The relief valve of claim 3, wherein weld material is deposited between the second body portion and the first body portion.

5. The relief valve of claim 4, wherein the weld material is E9015-B91.

6. The relief valve of claim 3, wherein the first end of the second body portion is welded to the first side of the first body portion by a butt weld.

7. The relief valve of claim 6, wherein the first side of the first body portion and the first end of the second body portion are angled away from each other in an outward radial direction.

8. The relief valve of claim 1, wherein the second body portion has a first end, a second opposite the first end, and a channel between the first and second ends, and wherein the first end of the second body portion is coupled to the first side of the first body portion, and wherein the channel at the second end of the second body portion forms the inlet.

9. The relief valve of claim 8, wherein the second end of the second body portion is flat.

10. The relief valve of claim 8, wherein the second end of the second body portion is tapered.

11. The relief valve of claim 1, wherein the first material of the first body portion is C12A, the second material of the second body portion is G115, and the nozzle is constructed of nickel alloy 625.

12. The relief valve of claim 1, wherein the inner surface of the second body portion has a first shoulder, and an outer surface of the nozzle has a second shoulder engaged with the first shoulder.

13. The relief valve of claim 1, wherein the seat divides the fluid passageway into an upstream portion and a downstream portion, wherein the upstream portion is defined by the inner surface of the second body portion and by an inner surface of the nozzle.

14. The relief valve of claim 13, wherein the first body portion of the valve body does not form or define the upstream portion of the fluid passageway.

15. The relief valve of claim 1, wherein the second body portion is not in direct connect with the first body portion.

16. The relief valve of claim 1, further including a spring to bias the flow control member toward the seat.

17. The relief valve of claim 16, further including a hand lever to move the flow control member away from the seat.

18. The relief valve of claim 1, wherein an outer surface of the second body portion has a craft flange.

* * * * *